(12) United States Patent  
Tani et al.

(10) Patent No.: US 11,972,907 B2  
(45) Date of Patent: Apr. 30, 2024

(54) SOLID ELECTROLYTIC CAPACITOR

(71) Applicant: Murata Manufacturing Co., Ltd., Nagaokakyo (JP)

(72) Inventors: Satoshi Tani, Nagaokakyo (JP); Kenichi Oshiumi, Nagaokakyo (JP); Kazutoyo Horio, Nagaokakyo (JP); Junichi Sato, Nagaokakyo (JP); Keiji Yoshida, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 141 days.

(21) Appl. No.: 17/841,181

(22) Filed: Jun. 15, 2022

(65) Prior Publication Data

US 2022/0310327 A1    Sep. 29, 2022

Related U.S. Application Data

(63) Continuation of application No. PCT/JP2020/046053, filed on Dec. 10, 2020.

(30) Foreign Application Priority Data

Dec. 18, 2019   (JP) ................................ 2019-228452

(51) Int. Cl.
*H01G 9/012*   (2006.01)
*H01G 9/10*    (2006.01)
(Continued)

(52) U.S. Cl.
CPC ............ *H01G 9/012* (2013.01); *H01G 9/10* (2013.01); *H01G 9/15* (2013.01); *H01G 9/26* (2013.01)

(58) Field of Classification Search
CPC ............ H01G 9/012; H01G 9/10; H01G 9/15
(Continued)

(56) References Cited

U.S. PATENT DOCUMENTS

2002/0015277 A1* 2/2002 Nitoh ................. H01G 9/028
                                                    361/523
2003/0026064 A1  2/2003 Nakada et al.
(Continued)

FOREIGN PATENT DOCUMENTS

JP    H0684716 A    3/1994
JP    2003086459 A  3/2003
(Continued)

OTHER PUBLICATIONS

International Search Report in PCT/JP2020/046053, dated Feb. 16, 2021, 3 pages.

*Primary Examiner* — Arun Ramaswamy
(74) *Attorney, Agent, or Firm* — Arentfox Shiff LLP (57) ABSTRACT

A solid electrolytic capacitor that includes a resin molding, a first external electrode, and a second external electrode. The resin molding includes a laminate of multiple capacitor elements, and a sealing resin sealing the laminate. The following are satisfied: $t_1<t_2$, $t_3<t_4$, $t_1<t_3$, and $t_4/t_3<t_2/t_1$, where $t_1$ is the thickness of an inner portion of the cathode lead-out layer, the inner portion not being exposed at the second end surface; $t_2$ is the thickness of an exposed portion of the cathode lead-out layer, the exposed portion being exposed at the second end surface; $t_3$ is the thickness of an inner portion of the valve-action metal substrate, the inner portion not being exposed at the first end surface; and $t_4$ is the thickness of an exposed portion of the valve-action metal substrate, the exposed portion being exposed at the first end surface.

20 Claims, 3 Drawing Sheets

(51) Int. Cl.
*H01G 9/15* (2006.01)
*H01G 9/26* (2006.01)

(58) Field of Classification Search
USPC ................ 361/523, 528, 532, 535, 538, 541
See application file for complete search history.

(56) References Cited

U.S. PATENT DOCUMENTS

| | | |
|---|---|---|
| 2004/0264111 A1 | 12/2004 | Shimoyama et al. |
| 2007/0242418 A1 | 10/2007 | Hashimoto |
| 2009/0310283 A1 | 12/2009 | Kim et al. |
| 2010/0165547 A1 | 7/2010 | Kuranuki et al. |
| 2011/0157776 A1* | 6/2011 | Ishida ................. H01G 9/0029 |
| | | 29/25.03 |
| 2014/0055912 A1* | 2/2014 | Onoue ................. H01G 9/0036 |
| | | 427/80 |
| 2017/0140877 A1* | 5/2017 | Kuromi ................. H01G 9/012 |
| 2019/0122827 A1 | 4/2019 | Furukawa et al. |
| 2020/0402724 A1 | 12/2020 | Nobuta et al. |

FOREIGN PATENT DOCUMENTS

| | | |
|---|---|---|
| JP | 2005026257 A | 1/2005 |
| JP | 2005045007 A | 2/2005 |
| JP | 2005340794 A | 12/2005 |
| JP | 2009076872 A | 4/2009 |
| JP | 2009302499 A | 12/2009 |
| JP | 2019079866 A | 5/2019 |
| WO | 2019176723 A1 | 9/2019 |

* cited by examiner

SOLID ELECTROLYTIC CAPACITOR

CROSS REFERENCE TO RELATED APPLICATIONS

The present application is a continuation of International application No. PCT/JP2020/046053, filed Dec. 10, 2020, which claims priority to Japanese Patent Application No. 2019-228452, filed Dec. 18, 2019, the entire contents of each of which are incorporated herein by reference.

FIELD OF THE INVENTION

The present invention relates to a solid electrolytic capacitor.

BACKGROUND OF THE INVENTION

A solid electrolytic capacitor includes a valve-action metal substrate including a substrate made of a valve-action metal such as aluminum and a dielectric layer on a surface of the substrate, and a cathode layer including a solid electrolyte layer on the dielectric layer.

For example, Patent Literature 1 discloses a method of producing a solid electrolytic capacitor that includes (A) preparing first sheets each including a valve-action metal substrate having a dielectric layer on a surface thereof and a solid electrolyte layer on the dielectric layer, (B) preparing second sheets made of metal foil, (C) covering each first sheet with an insulating material, (D) forming a conductor layer on the solid electrolyte layer of each first sheet, (E) alternately stacking the first sheets and the second sheets to produce a stack of the sheets, (F) filling through-holes of the stack of the sheets with a sealing material to produce a multilayer block body, (G) cutting the multilayer block body to produce multiple element laminates, and (H) forming a first external electrode and a second external electrode.
Patent Literature 1: JP 2019-79866 A

SUMMARY OF THE INVENTION

According to Patent Literature 1, the valve-action metal substrates as anodes and the metal foil as cathodes can be exposed at respective end surfaces of each element laminate when the multilayer block body is cut and singulated into element laminates. Thus, polishing of the end surfaces of the element laminates is no longer required, enabling efficient production of solid electrolytic capacitors.

Such a solid electrolytic capacitor may have a high equivalent series resistance (ESR) or a low adhesion to external electrodes when the proportions (contact areas) of the anodes and the cathodes exposed at the end surfaces are small.

In addition, the smaller the size of the solid electrolytic capacitor, the thinner the anodes and the cathodes, which makes it difficult to reduce the ESR and increase the adhesion to the external electrodes. This tendency is more apparent in the cathodes that are thinner than the anodes.

The present invention was made to solve the above issues, and aims to provide a solid electrolytic capacitor having a low ESR and a high adhesion to external electrodes.

A solid electrolytic capacitor of a first aspect of the present invention includes a resin molding, a first external electrode, and a second external electrode. The resin molding includes a laminate of multiple capacitor elements, and a sealing resin sealing the laminate. The resin molding defines a bottom surface and a top surface opposite to each other in a thickness direction parallel to a lamination direction of the capacitor elements; a first end surface and a second end surface opposite to each other in a length direction perpendicular to the lamination direction; and a first side surface and a second side surface opposite to each other in a width direction perpendicular to the lamination direction and the length direction. The first external electrode is on the first end surface of the resin molding and electrically connected to the valve-action metal substrate exposed at the first end surface. The second external electrode is on the second end surface of the resin molding and electrically connected to the cathode lead-out layer exposed at the second end surface. Each capacitor element of the multiple capacitor elements includes: an anode comprising a valve-action metal substrate including a core and a porous portion on a surface of the core; a dielectric layer on a surface of the anode; and a cathode opposite to the anode across the dielectric layer and including a cathode lead-out layer.

In a first embodiment of the present invention, the following are satisfied: $t_1 < t_2$, $t_3 < t_4$, $t_1 < t_3$, and $t_4/t_3 < t_2/t_1$, where $t_1$ is a thickness of an inner portion of the cathode lead-out layer, the inner portion not being exposed at the second end surface; $t_2$ is a thickness of an exposed portion of the cathode lead-out layer, the exposed portion being exposed at the second end surface; $t_3$ is a thickness of an inner portion of the valve-action metal substrate, the inner portion not being exposed at the first end surface; and $t_4$ is a thickness of an exposed portion of the valve-action metal substrate, the exposed portion being exposed at the first end surface.

According to a second embodiment of the present invention, the following are satisfied: $t_1 < t_2$, $t_3 < t_4$, $t_1 > t_3$, and $t_4/t_3 > t_2/t_1$, where $t_1$ is a thickness of an inner portion of the cathode lead-out layer, the inner portion not being exposed at the second end surface; $t_2$ is a thickness of an exposed portion of the cathode lead-out layer, the exposed portion being exposed at the second end surface; $t_3$ is a thickness of an inner portion of the valve-action metal substrate, the inner portion not being exposed at the first end surface; and $t_4$ is a thickness of an exposed portion of the valve-action metal substrate, the exposed portion being exposed at the first end surface.

The present invention can provide a solid electrolytic capacitor having a low ESR and a high adhesion to external electrodes.

DETAILED DESCRIPTION OF THE PREFERRED EMBODIMENTS

The solid electrolytic capacitor of the present invention is described below.

The present invention is not limited to the following preferred embodiments, and may be suitably modified without departing from the gist of the present invention. Combinations of two or more preferred features described in the following preferred embodiments are also within the scope of the present invention.

Solid Electrolytic Capacitor

Figure 1:
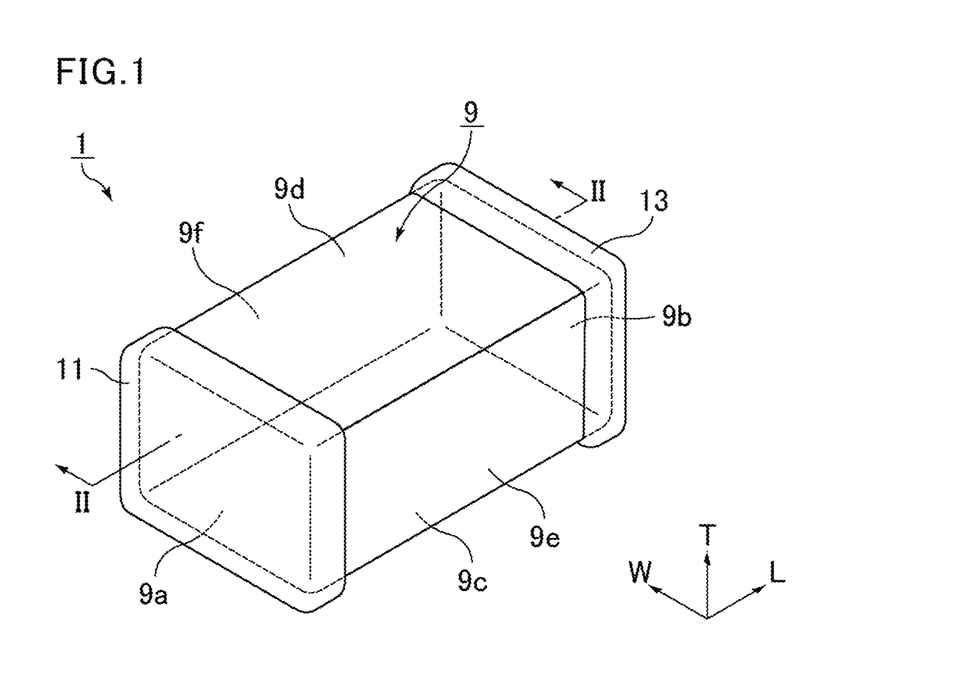
FIG. 1 is a schematic perspective view of an example of the solid electrolytic capacitor of the present invention.

FIG. 1 is a schematic perspective view of an example of the solid electrolytic capacitor of the present invention.

A solid electrolytic capacitor 1 shown in FIG. 1 is a surface mounted solid electrolytic capacitor, and includes a resin molding 9, a first external electrode 11, and a second external electrode 13.

The resin molding 9 is cuboidal in shape. The resin molding 9 includes a first end surface 9a and a second end surface 9b opposite to each other in a length direction (L direction), a bottom surface 9c and a top surface 9d opposite to each other in a thickness direction (T direction), and a first side surface 9e and a second side surface 9f opposite to each other in a width direction (W direction). Here, the length direction, the width direction, and the thickness direction are perpendicular to one other.

The first external electrode 11 is disposed on the first end surface 9a, and the second external electrode 13 is disposed on the second end surface 9b.

The bottom surface 9c is a mounting surface of the solid electrolytic capacitor.

Herein, a plane along the length direction and the thickness direction of the solid electrolytic capacitor or the resin molding is referred to as an "LT plane", a plane along the length direction and the width direction is referred to as an "LW plane", and a plane along the width direction and the thickness direction is referred to as a "WT plane". Thus, in the solid electrolytic capacitor 1 shown in FIG. 1, the resin molding 9 includes the first end surface 9a and the second end surface 9b as the WT planes, the bottom surface 9c and the top surface 9d as the LW planes, and the first side surface 9e and the second side surface 9f as the LT planes.

Figure 2:
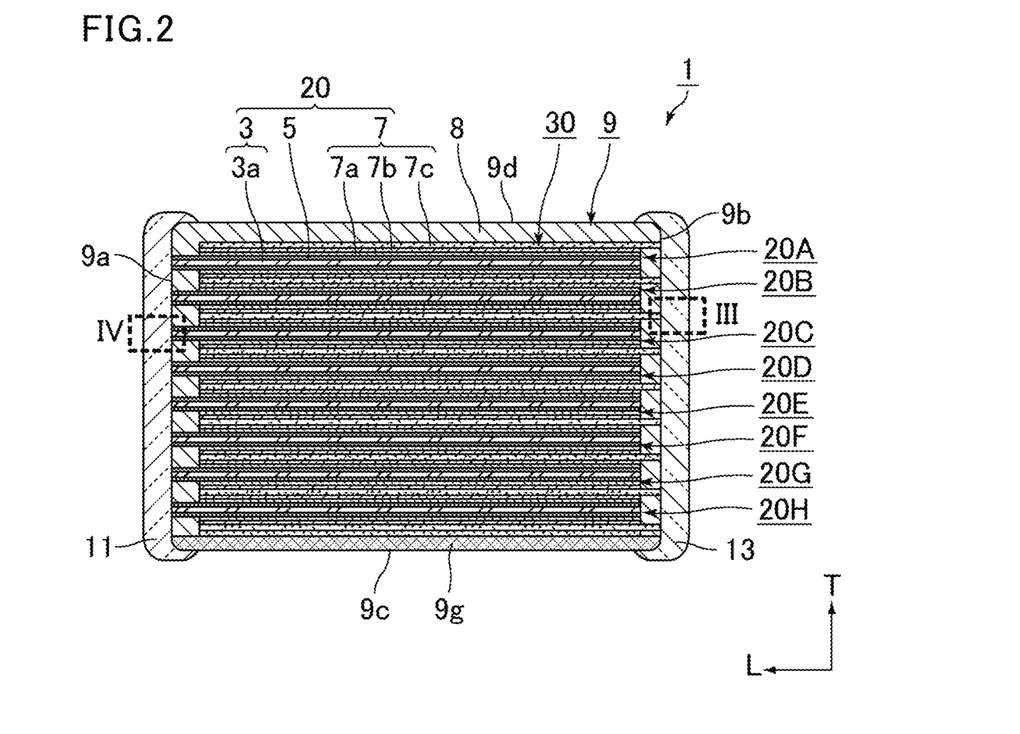
FIG. 2 is a cross-sectional view taken along line II-II of the solid electrolytic capacitor shown in FIG. 1.

FIG. 2 is a cross-sectional view taken along line II-II of the solid electrolytic capacitor shown in FIG. 1.

The resin molding 9 includes a laminate 30 of multiple capacitor elements 20, and a sealing resin 8 sealing the laminate 30. In the example shown in FIG. 2, eight capacitor elements 20A, 20B, 20C, 20D, 20E, 20F, 20G, and 20H are laminated. A lamination direction of the capacitor elements 20 is parallel to the thickness direction (T direction) of the resin molding 9.

In the example shown in FIG. 2, the resin molding 9 includes a support substrate 9g on its bottom, and a surface of the bottom of the support substrate 9g is the bottom surface 9c of the resin molding 9. The support substrate 9g is disposed to consolidate the laminate 30 of the capacitor elements 20.

Each capacitor element 20 includes an anode 3 having a dielectric layer 5 on its surface, and a cathode 7 opposite to the anode 3 across the dielectric layer 5. In the laminate 30, the capacitor elements 20 that are laminated may be bonded to each other via a conductive adhesive (not shown). In this case, the conductive adhesive is regarded as a part of the cathode 7.

The anode 3 of each capacitor element 20 includes a valve-action metal substrate 3a. The valve-action metal substrate 3a includes a core and a porous portion such as an etched layer on a surface of the core. The dielectric layer 5 is disposed on a surface of the porous portion.

The valve-action metal substrate 3a is led out to the first end surface 9a of the resin molding 9. The first external electrode 11 on the first end surface 9a of the resin molding 9 is electrically connected to the valve-action metal substrate 3a exposed at the first end surface 9a.

The cathode 7 of each capacitor elements 20 includes a solid electrolyte layer 7a on the dielectric layer 5, a conductive layer 7b on the solid electrolyte layer 7a, and a cathode lead-out layer 7c on the conductive layer 7b.

The cathode lead-out layer 7c is led out to the second end surface 9b of the resin molding 9. The second external electrode 13 on the second end surface 9b of the resin molding 9 is electrically connected to the cathode lead-out layer 7c exposed at the second end surface 9b.

In the example shown in FIG. 2, the valve-action metal substrate 3a of each capacitor elements 20 is configured such that its end adjacent to the second end surface 9b is sealed by the sealing resin 8. Thus, the valve-action metal substrate 3a is not in direct contact with the solid electrolyte layer 7a or the conductive layer 7b. When the end of the valve-action metal substrate 3a adjacent to the second end surface 9b is insulated by, for example, being covered with the dielectric layer 5, the end of the valve-action metal substrate 3a adjacent to the second end surface 9b may be covered with the solid electrolyte layer 7a and the conductive layer 7b.

Figure 3:
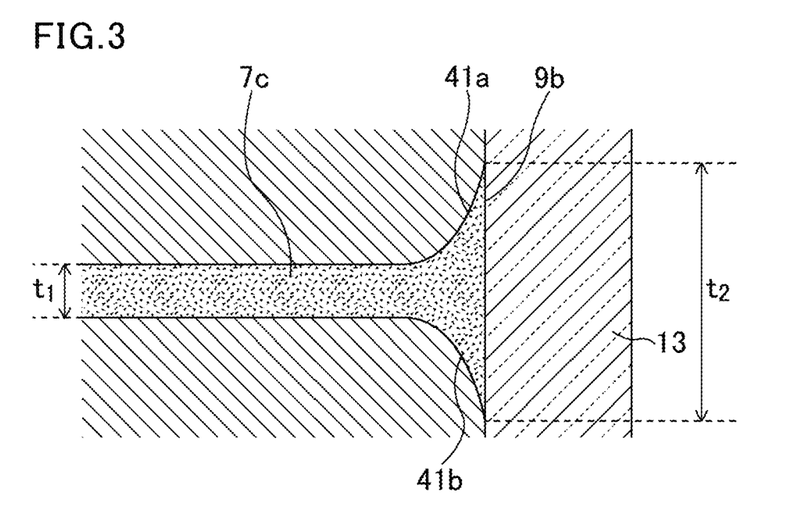
FIG. 3 is an enlarged cross-sectional view of a portion III of the solid electrolytic capacitor shown in FIG. 2.

FIG. 3 is an enlarged cross-sectional view of a portion III of the solid electrolytic capacitor shown in FIG. 2.

In FIG. 3, a formula $t_1 < t_2$ is satisfied, where $t_1$ is the thickness of an inner portion of the cathode lead-out layer 7c, the inner portion not being exposed at the second end surface 9b; and $t_2$ is the thickness of an exposed portion of the cathode lead-out layer 7c, the exposed portion being exposed at the second end surface 9b. This increases the contact area between the exposed portion of the cathode lead-out layer 7c and the second external electrode 13, resulting in a lower ESR of the solid electrolytic capacitor.

Figure 4:
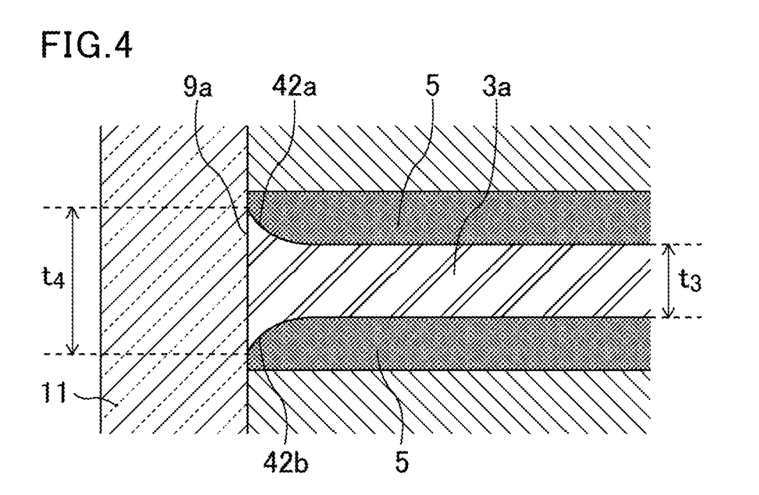
FIG. 4 is an enlarged cross-sectional view of a portion IV of the solid electrolytic capacitor shown in FIG. 2.

FIG. 4 is an enlarged cross-sectional view of a portion IV of the solid electrolytic capacitor shown in FIG. 2.

In FIG. 4, a formula $t_3 < t_4$ is satisfied, where $t_3$ is the thickness of an inner portion of the valve-action metal substrate 3a, the inner portion being not exposed at the first end surface 9a; and $t_4$ is the thickness of an exposed portion of the valve-action metal substrate 3a, the exposed portion being exposed at the first end surface 9a. This increases the contact area between the exposed portion of the valve-action metal substrate 3a and the first external electrode 11, resulting in a lower ESR of the solid electrolytic capacitor.

Neither the thickness $t_3$ of the inner portion of the valve-action metal substrate 3a nor the thickness $t_4$ of the exposed portion of the valve-action metal substrate 3a includes the thickness of the porous portion. In other words, these thicknesses are each the thickness of the core excluding the porous portion.

In the first embodiment of the present invention, $t_1 < t_3$, and $t_4/t_3 < t_2/t_1$ are satisfied as shown in FIG. 3 and FIG. 4. Consequently, even when each cathode lead-out layer 7c is thinner than the valve-action metal substrate 3a, the contact area between the exposed portion of the cathode lead-out layer 7c and the second external electrode 13 can be increased, resulting in an even lower ESR of the solid electrolytic capacitor.

In the first embodiment of the present invention, the value of $t_2/t_1$ is preferably in the range of 1 to 5, more preferably in the range of 2 to 3.

In the first embodiment of the present invention, the value of $t_4/t_3$ is preferably in the range of 0.5 to 3, more preferably in the range of 1 to 2.

As shown in FIG. 3, preferably, the cathode lead-out layer 7c includes reverse tapered portions 41a and 41b whose thicknesses increase toward the second end surface 9b. When the cathode lead-out layer 7c includes such a reverse tapered portion, the cathode lead-out layer 7c may include only the reverse tapered portion 41a whose upper side is inclined, or may include only the reverse tapered portion 41b whose lower side is inclined.

When the cathode lead-out layer 7c includes one or more reverse tapered portions, the cathode lead-out layers 7c of all the capacitor elements 20 that are laminated may each include one or more reverse tapered portions, the cathode lead-out layers 7c of some capacitor elements 20 may each include one or more reverse tapered portions, or the cathode lead-out layer 7c of one capacitor element 20 may include one or more reverse tapered portions. When the cathode lead-out layers 7c of multiple capacitor elements 20 each include one or more reverse tapered portions, the shapes of the reverse tapered portions may be the same or different.

As shown in FIG. 4, preferably, the valve-action metal substrate 3a includes reverse tapered portions 42a and 42b whose thicknesses increase toward the first end surface 9a. When the valve-action metal substrate 3a has a reverse tapered portion, the valve-action metal substrate 3a may include only the reverse tapered portion 42a that whose upper side is inclined, or may include only the reverse tapered portion 42b whose lower side is inclined.

When the valve-action metal substrate 3a includes one or more reverse tapered portions, the valve-action metal substrates 3a of all the capacitor elements 20 that are laminated may each include one or more reverse tapered portions, the valve-action metal substrates 3a of some capacitor elements 20 may each include one or more reverse tapered portions, or the valve-action metal substrate 3a of one capacitor element 20 may include one or more reverse tapered portions. When the valve-action metal substrates 3a of multiple capacitor elements 20 each include one or more reverse tapered portions, the shapes of the reverse tapered portions may be the same or different.

Either the cathode lead-out layer 7c or the valve-action metal substrate 3a may include one or more reverse tapered portions, or both the cathode lead-out layer 7c and the valve-action metal substrate 3a may include reverse tapered portions. When both the cathode lead-out layer 7c and the valve-action metal substrate 3a include reverse tapered portions, the shapes of the reverse tapered portions may be the same or different.

The shape of the reverse tapered portion may be a linear or curved taper. The curved taper (also referred to as a "trumpet-shaped taper") may be an exponential taper or a taper that cannot be expressed by a specific function.

Figure 5:
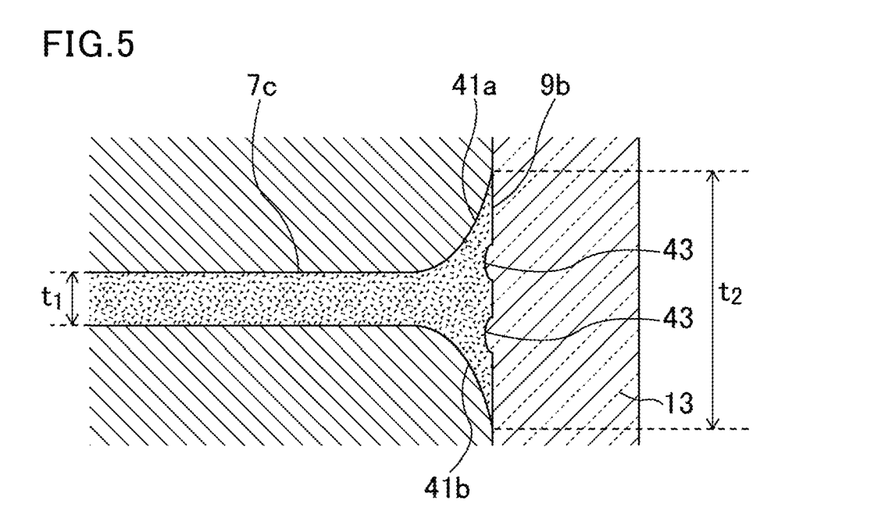
FIG. 5 is a schematic cross-sectional view of another example of an exposed portion of a cathode lead-out layer.

FIG. 5 is a schematic cross-sectional view of another example of the exposed portion of the cathode lead-out layer.

As shown in FIG. 5, the exposed portion of the cathode lead-out layer 7c may have recesses 43 internally recessed from the second end surface 9b. The recesses 43 in the exposed portion of the cathode lead-out layer 7c can further increase the contact area between the exposed portion of the cathode lead-out layer 7c and the second external electrode 13.

When the cathode lead-out layer 7c includes the recesses, the cathode lead-out layers 7c of all the capacitor elements 20 that are laminated may each include the recesses, the cathode lead-out layers 7c of some capacitor elements 20 may each include the recesses, or the cathode lead-out layer 7c of one capacitor element 20 may include the recesses.

When the cathode lead-out layers 7c of multiple capacitor elements 20 each include the recesses, the shapes of the recesses may be the same or different.

When the cathode lead-out layer 7c includes the recesses, the cathode lead-out layer 7c may include one or more reverse tapered portions or may not include any reverse tapered portions.

Figure 6:
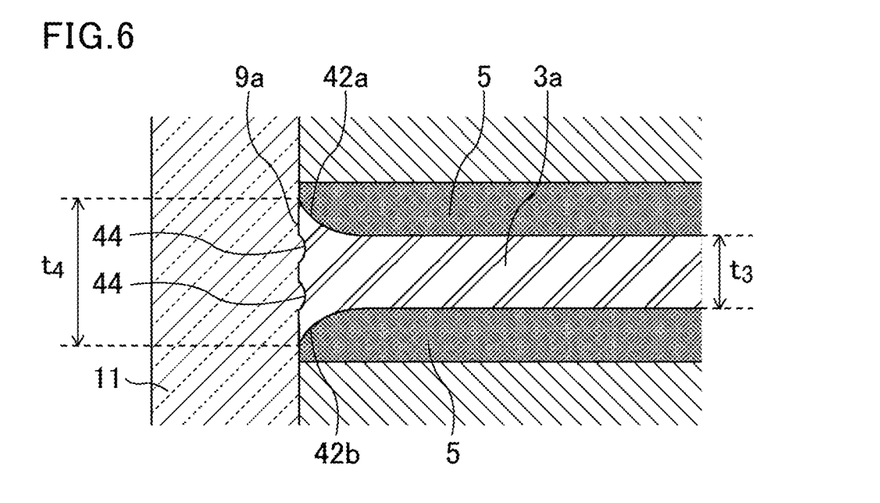
FIG. 6 is a schematic cross-sectional view of another example of an exposed portion of a valve-action metal substrate.

FIG. 6 is a schematic cross-sectional view of another example of the exposed portion of the valve-action metal substrate.

As shown in FIG. 6, the exposed portion of the valve-action metal substrate 3a may include recesses 44 internally recessed from the first end surface 9a. The recesses 44 in the exposed portion of the valve-action metal substrate 3a can further increase the contact area between the exposed portion of the valve-action metal substrate 3a and the first external electrode 11.

When the valve-action metal substrate 3a includes the recesses, the valve-action metal substrates 3a of all the capacitor elements 20 that are laminated may each include the recesses, the valve-action metal substrates 3a of some capacitor elements 20 may each include the recesses, or valve-action metal substrate 3a of one capacitor elements 20 may include the recesses. When the valve-action metal substrates 3a of multiple capacitor elements 20 each include the recesses, the shapes of the recesses may be the same or different.

When the valve-action metal substrate 3a includes the recesses, the valve-action metal substrate 3a may include one or more reverse tapered portions or may not include any reverse tapered portions.

Either the cathode lead-out layer 7c or the valve-action metal substrate 3a may include the recesses, or both the cathode lead-out layer 7c and the valve-action metal substrate 3a may include the recesses. When both the cathode lead-out layer 7c and the valve-action metal substrate 3a include the recesses, the shapes of the recesses may be the same or different.

When the exposed portion of the cathode lead-out layer 7c or the exposed portion of the valve-action metal substrate 3a includes recesses, the recesses are not limited in terms of the position, number, shape, or the like.

The valve-action metal substrate 3a is made of a valve-action metal having a valve action. Examples of the valve-action metal include elemental metals such as aluminum, tantalum, niobium, titanium, zirconium, magnesium, and silicon, and alloys containing these metals. Of these, aluminum and an aluminum alloy are preferred.

The valve-action metal substrate 3a may have any shape, but the shape is preferably flat, and is more preferably a foil sheet.

The porous portion on the surface of the valve-action metal substrate 3a can increase the specific surface area of the valve-action metal substrate 3a, which in turn can increase the capacitance of the solid electrolytic capacitor 1. The porous portion may be, for example, an etched layer formed on the surface of the valve-action metal substrate 3, or a porous layer formed on the surface of the valve-action metal substrate 3 by printing or sintering. When the valve-action metal is aluminum or an aluminum alloy, an etched layer is preferred. When the valve-action metal is titanium or a titanium alloy, a porous layer is preferred.

The thickness of the valve-action metal substrate 3a is not limited, but the thickness of the core excluding the porous portion is preferably 5 µm to 100 µm. The thickness of the porous portion (thickness on one side) is preferably 5 µm to 200 µm.

The above-described thickness of the valve-action metal substrate 3a is the thickness of the valve-action metal substrate 3a excluding a portion exposed at the end surface.

Preferably, the dielectric layer 5 is made of an oxide film of the valve-action metal. For example, when aluminum foil is used as the valve-action metal substrate 3a, the aluminum foil is anodized in an aqueous solution containing boric acid, phosphoric acid, adipic acid, a sodium salt or an ammonium salt thereof, or the like, whereby an oxide film as the dielectric layer 5 can be formed.

The dielectric layer 5 is formed along the surface of the porous portion, whereby pores (recesses) are formed in the dielectric layer. The thickness of the dielectric layer 5 is designed according to the withstand voltage and capacitance required for the solid electrolytic capacitor, but the thickness is preferably 10 nm to 100 nm.

In order to increase the production efficiency of the solid electrolytic capacitor, the valve-action metal substrate 3a including the dielectric layer 5 on the surface may be chemically treated foil subjected to pre-chemical treatment.

Examples of materials of the solid electrolyte layer 7a include a conductive polymer having a pyrrole, thiophene, or aniline skeleton. A conductive polymer having a thiophene skeleton is, for example, poly(3,4-ethylenedioxythiophene) (PEDOT), and may be PEDOT:PSS which is a complex with a dopant (poly(styrene sulfonate) (PSS)).

The solid electrolyte layer 7a is formed by, for example, a method in which a polymerized film of poly(3,4-ethylenedioxythiophene) or the like is formed on a surface of the dielectric layer 5 using a treatment liquid containing a monomer such as 3,4-ethylenedioxythiophene or a method in which a dispersion of a polymer such as poly(3,4-ethylenedioxythiophene) is applied to the surface of the dielectric layer 5 and dried. Formation of the solid electrolyte layer for an inner layer for filling the pores (recesses) is preferably followed by formation of a solid electrolyte layer for an outer layer for covering the entire dielectric layer.

The solid electrolyte layer 7a can be formed in a predetermined region by applying the treatment liquid or dispersion to the dielectric layer 5 by, for example, sponge transfer, screen printing, spray coating, inkjet printing, or using a dispenser. The thickness of the solid electrolyte layer 7a is preferably 2 μm to 20 μm.

The conductive layer 7b is disposed to electrically and mechanically interconnect the solid electrolyte layer 7a and the cathode lead-out layer 7c. For example, the conductive layer 7b is preferably a carbon layer, a graphene layer, or a silver layer formed by applying a conductive paste such as a carbon paste, a graphene paste, or a silver paste. The conductive layer 7b may be a composite layer in which a silver layer is disposed on a carbon layer or a graphene layer, or a mixed layer containing a mixture of a carbon paste or a graphene paste with a silver paste.

The conductive layer 7b can be formed on the solid electrolyte layer 7a by applying a conductive paste such as a carbon paste by, for example, sponge transfer, screen printing, spray coating, inkjet printing, or using a dispenser. Preferably, the cathode lead-out layer 7c to be formed in the subsequent step is stacked while the conductive layer 7b is viscous before drying. The thickness of the conductive layer 7b is preferably 2 μm to 20 μm.

A conductive adhesive layer may be disposed on the conductive layer 7b. Examples of materials of the conductive adhesive layer include mixtures of insulating resins such as an epoxy resin and a phenolic resin and conductive particles such as carbon and silver.

The cathode lead-out layer 7c can be made of metal foil or a printed electrode layer.

When the cathode lead-out layer 7c is made of metal foil, preferably, the metal foil is made of at least one metal selected from the group consisting of aluminum, nickel, copper, silver, an alloy mainly containing any of these metals, and a stainless steel (SUS). The metal foil made of any of the above metals can reduce the resistance of the metal foil, and thus can reduce the ESR. The metal foil may be metal foil whose surface is coated with carbon or titanium by a film formation method such as sputtering or deposition. Use of carbon-coated aluminum foil is more preferred.

The thickness of the metal foil is not limited. Yet, in order to facilitate handling in the production process, achieve miniaturization, and reduce the ESR, the thickness is preferably 20 μm to 50 μm.

Preferably, a surface of the metal foil includes a roughened surface. A roughened surface on the surface of the metal foil improves adhesion between the electrode lead-out layer 7c and the conductive layer 7b, which can reduce the ESR. The roughened surface may be formed by any method, such as etching. In particular, in the case of use of aluminum foil, preferably, carbon coating or titanium coating is applied to a roughened (e.g., etched) surface of the aluminum foil in terms of lower resistance.

In addition, a coat layer made of an anchor coating agent may be formed on the metal foil. A coat layer made of an anchor coating agent on the surface of the metal foil layer improves adhesion between the cathode lead-out layer 7c and the conductive layer 7b or the like, which can reduce the ESR.

When the cathode lead-out layer 7c is made of a printed electrode layer, an electrode paste is applied to the conductive layer 7b by, for example, sponge transfer, screen printing, spray coating, inkjet printing, or using a dispenser, whereby the cathode lead-out layer 7c can be formed on a predetermined region. Preferably, the electrode paste is an electrode paste mainly containing nickel, silver, or copper. When the cathode lead-out layer 7c is made of a printed electrode layer, the cathode lead-out layer 7c can be made thinner than when the cathode lead-out layer 7c is made of metal foil. In the case of screen printing, for example, the thickness can be adjusted to 2 μm to 20 μm.

The above-described thickness of the cathode lead-out layer 7c is the thickness of the cathode lead-out layer 7c excluding a portion exposed at the end surface.

The sealing resin 8 of the resin molding 9 contains at least a resin, and preferably contains a resin and filler. Examples of the resin in the sealing resin 8 include an epoxy resin, a phenolic resin, a polyimide resin, a silicone resin, a polyamide resin, and a liquid crystal polymer. The resin in either solid or liquid form can be used. Examples of the filler in the sealing resin 8 include silica particles, alumina particles, and metal particles. More preferably, the sealing resin 8 is made of a material containing silica particles in a solid epoxy resin and a phenolic resin.

When the sealing resin 8 contains a resin and filler, preferably, the maximum diameter of the filler is smaller than the minimum thickness of the cathode lead-out layer 7c in order to ensure filling properties of the sealing resin 8. Preferably, the maximum diameter of the filler is in the range of 30 μm to 40 μm, for example.

When a solid sealing material is used, the resin molding 9 is preferably formed by a method that uses a resin mold such as a compression mold or a transfer mold, with a compression mold being more preferably used. When a liquid sealing material is used, the resin molding is preferably formed by a method that uses a dispenser or printing. Preferably, a compression mold is used to seal the laminate 30 of the capacitor elements 20 by the sealing resin 8 to produce the resin molding 9.

As shown in the example in FIG. 2, preferably, the resin molding 9 includes the support substrate 9g on its bottom. Preferably, the support substrate 9g is made of an insulating material. Examples of the insulating material of the support substrate 9g include a glass epoxy resin, a glass composite, a phenolic resin, a polyimide resin, a polyamide resin, a fluororesin, a polyphenylene oxide (PPO) resin, and a bis-maleimide-triazine (BT) resin.

Preferably, each corner of the resin molding 9 is rounded by barrel polishing after molding in a resin mold. The corner is where three surfaces of the resin molding 9 meet. A resin molding is softer than a ceramic body and it is thus difficult to round the corners by barrel polishing. Yet, it is possible, by adjusting the composition, particle size, and shape of a medium, treatment time in a barrel, and the like, to produce round corners each having a small curvature radius.

The first external electrode 11 and the second external electrode 13 can be formed by, for example, plating, sputtering, immersion coating, or printing. A plating layer that can be used may be a Zn·Ag·Ni layer, a Ag·Ni layer, a Ni layer, a Zn·Ni·Au layer, a Ni·Au layer, a Zn·Ni·Cu layer, or a Ni·Cu layer, for example. Preferably, additional plating layers including a Cu plating layer, a Ni plating layer, and a Sn plating layer in the stated order (or without one or some of these layers) are formed on the above plating layers.

The following describes a second embodiment of the present invention. In the second embodiment of the present invention, the formulas $t_1<t_2$ and $t_3<t_4$ are satisfied as in the first embodiment. The formulas $t_1>t_3$ and $t_4/t_3>t_2/t_1$ can also be satisfied in the depiction in FIG. 3 and FIG. 4. When the cathode lead-out layer 7c is made of an electrode paste, there are cases where the cathode lead-out layer 7c is thicker than the valve-action metal substrate 3a. However, the ESR of the solid electrolytic capacitor can be further reduced by maximizing the size of the exposed portion of the cathode lead-out layer 7c and thus increasing the contact area with the second external electrode 13.

In the second embodiment of the present invention, the value of $t_2/t_1$ is preferably in the range of 1 to 3, more preferably in the range of 1 to 2.

In the second embodiment of the present invention, the value of $t_4/t_3$ is preferably in the range of 0.5 to 3, more preferably in the range of 1 to 2.

Method of Producing Solid Electrolytic Capacitor

The solid electrolytic capacitor of the present invention can be produced by the following method, for example.

Production of Capacitor Element

A valve-action metal substrate such as aluminum foil including a core and a porous portion such as an etched layer on a surface of the core is provided, and a dielectric layer is formed on a surface of the porous portion by anode oxidation. Then, a solid electrolyte layer is formed on the dielectric layer by screen printing, and subsequently, a carbon layer as the conductive layer is formed on the solid electrolyte layer by screen printing. Further, a cathode lead-out layer is formed on the carbon layer by lamination or screen printing. A capacitor element is obtained by the above steps.

Production of Resin Molding

Multiple capacitor elements are stacked and then compression-bonded by thermocompression bonding or the like to produce a laminate. Preferably, the capacitor elements are stacked on the support substrate. Then, the laminate is sealed by a sealing resin in a compression mold or the like. A resin molding can be obtained by the above steps.

The resin molding may be produced by the production method disclosed in JP 2019-79866 A. The resin molding production method includes preparing first sheets, preparing second sheets, covering the first sheets with an insulating material, forming a conductor layer on a solid electrolyte layer of each first sheet, alternately stacking the first sheets and the second sheets to produce a stack of the sheets, sealing the stack by a sealing resin to produce a multilayer block body, and cutting the multilayer block body to produce multiple resin moldings.

Each first sheet is a sheet including a valve-action metal substrate having a dielectric layer on a surface of the valve-action metal substrate and a solid electrolyte layer on the dielectric layer. Each second sheet is a sheet made of metal foil. The first sheets and the second sheets each include a through hole in a portion corresponding to a first end surface or a second end surface of the resin molding. These through holes are arranged such that they are in communication with each other when the sheets are stacked. Then, the through holes are filled with a sealing resin when the stack of the sheets is sealed by the sealing resin, whereby a multilayer block body is produced. This multilayer block body is cut such that the sealing resin filling the through holes is separated, whereby resin moldings can be obtained. In such a resin molding, the valve-action metal substrates are each separately exposed as multiple anode portions due to the presence of the sealing resin filling the through holes, and cathode lead-out layers are each also separately exposed as multiple cathode portions due to the presence of the sealing resin filling the through holes.

The multilayer block body is cut by, for example, a method such as dicing with a dicer. It is possible to change the shape of the exposed portion between the valve-action metal substrate and the cathode lead-out layer by, for example, changing the dicing blade thickness, material, or the like.

Formation of External Electrodes

A first external electrode is formed on a first end surface of the resin molding, and a second external electrode is formed on a second end surface of the resin molding. The solid electrolytic capacitor of the present invention can be obtained by the above steps.

The solid electrolytic capacitor of the present invention is not limited to those according to the embodiments described above. Various modifications and changes can be made to the configuration of the solid electrolytic capacitor, production conditions, and the like within the scope of the present invention.

In the solid electrolytic capacitor of the present invention, one or more cathode lead-out layers 7c sealed by the sealing resin 8 may each be configured such that its end adjacent to the first side surface 9e has a shape shown in FIG. 3 or FIG. 5. In other words, $t_1<t_5$ may be satisfied, where $t_5$ is the thickness of the end of the cathode lead-out layer 7c adjacent to the first side surface 9e. In this case, preferably, the cathode lead-out layer 7c includes one or more reverse tapered portions whose thicknesses increase toward the first side surface 9e. The end of the cathode lead-out layer 7c adjacent to the first side surface 9e may include recesses internally recessed.

In the solid electrolytic capacitor of the present invention, one or more cathode lead-out layers 7c sealed by the sealing resin 8 may each be configured such that its end adjacent to the second side surface 9f has a shape shown in FIG. 3 or FIG. 5. In other words, $t_1<t_6$ may be satisfied, where $t_6$ is the thickness of the end of the cathode lead-out layer 7c adjacent to the second side surface 9f. In this case, preferably, the cathode lead-out layer 7c includes one or more reverse tapered portions whose thicknesses increase toward the second side surface 9f. The end of the cathode lead-out layer 7c adjacent to the second side surface 9f may include recesses internally recessed. The shape of the end of the cathode lead-out layer 7c adjacent to the second side surface 9f may be the same as or different from the shape of the end of the cathode lead-out layer 7c adjacent to the first side surface 9e.

In the solid electrolytic capacitor of the present invention, one or more valve-action metal substrate 3a sealed by the sealing resin 8 may each be configured such that its end adjacent to the first side surface 9e has a shape shown in FIG. 4 or FIG. 6. In other words, $t_3 < t_7$ may be satisfied, where $t_7$ is the thickness of the end of the valve-action metal substrate 3a adjacent to the first side surface 9e. In this case, preferably, the valve-action metal substrate 3a has one or more reverse tapered portions whose thicknesses increase toward the first side surface 9e. The end of the valve-action metal substrate 3a adjacent to the first side surface 9e may have recesses internally recessed.

In the solid electrolytic capacitor of the present invention, one or more valve-action metal substrate 3a sealed by the sealing resin 8 may each be configured such that its end adjacent to the second side surface 9f has a shape shown in FIG. 4 or FIG. 6. In other words, $t_3 < t_8$ may be satisfied, where $t_8$ is the thickness of the end of the valve-action metal substrate 3a adjacent to the second side surface 9f. In this case, preferably, the valve-action metal substrate 3a includes one or more reverse tapered portions whose thicknesses increase toward the second side surface 9f. The end of the valve-action metal substrate 3a adjacent to the second side surface 9f may include recesses internally recessed. The shape of the end of the valve-action metal substrate 3a adjacent to the second side surface 9f may be the same as or different from the shape of the end of the valve-action metal substrate 3a adjacent to the first side surface 9e.

For example, when the resin molding is produced by the production method disclosed in JP 2019-79866 A, it is possible to change the shapes of the end of the cathode lead-out layer 7c adjacent to the first side surface 9e, the end of the cathode lead-out layer 7c adjacent to the second side surface 9f, the end of the valve-action metal substrate 3a adjacent to the first side surface 9e, and the end of the valve-action metal substrate 3a adjacent to the second side surface 9f as described above.

REFERENCE SIGNS LIST

1: solid electrolytic capacitor
3: anode
3a: valve-action metal substrate
5: dielectric layer
7: cathode
7a: solid electrolyte layer
7b: conductive layer
7c: cathode lead-out layer
8: sealing resin
9: resin molding
9a: first end surface
9b: second end surface
9c: bottom surface
9d: top surface
9e: first side surface
9f: second side surface
9g: support substrate
11: first external electrode
13: second external electrode
20, 20A, 20B, 20C, 20D, 20E, 20F, 20G, 20H: capacitor element
30: laminate
41a, 41b: reverse tapered portion of cathode lead-out layer
42a, 42b: reverse tapered portion of valve-action metal substrate
43: recess in exposed portion of cathode lead-out layer
44: recess in exposed portion of valve-action metal substrate
$t_1$: thickness of inner portion of cathode lead-out layer, the inner portion not being exposed at second end surface
$t_2$: thickness of exposed portion of cathode lead-out layer, the exposed portion being exposed at second end surface
$t_3$: thickness of inner portion of valve-action metal substrate, the inner portion not being exposed at first end surface
$t_4$: thickness of exposed portion of valve-action metal substrate, the exposed portion exposed at first end surface

The invention claimed is:

1. A solid electrolytic capacitor comprising:
a resin molding including:
a laminate of multiple capacitor elements, each capacitor element of the multiple capacitor elements including:
an anode comprising a valve-action metal substrate including a core and a porous portion on a surface of the core;
a dielectric layer on a surface of the anode; and
a cathode opposite to the anode across the dielectric layer and including a cathode lead-out layer; and
a sealing resin sealing the laminate,
wherein the resin molding defines a bottom surface and a top surface opposite to each other in a thickness direction parallel to a lamination direction of the multiple capacitor elements, a first end surface and a second end surface opposite to each other in a length direction perpendicular to the lamination direction, and a first side surface and a second side surface opposite to each other in a width direction perpendicular to the lamination direction and the length direction;
a first external electrode on the first end surface of the resin molding and electrically connected to the valve-action metal substrate exposed at the first end surface; and
a second external electrode on the second end surface of the resin molding and electrically connected to the cathode lead-out layer exposed at the second end surface,
wherein the following are satisfied:
$t_1 < t_2$,
$t_3 < t_4$,
$t_1 < t_3$, and
$t_4/t_3 < t_2/t_1$,
where t1 is a thickness of an inner portion of the cathode lead-out layer, the inner portion not being exposed at the second end surface,
$t_2$ is a thickness of an exposed portion of the cathode lead-out layer, the exposed portion being exposed at the second end surface, $t_3$ is a thickness of an inner portion of the valve-action metal substrate, the inner portion not being exposed at the first end surface, and $t_4$ is a thickness of an exposed portion of the valve-action metal substrate, the exposed portion being exposed at the first end surface.

2. The solid electrolytic capacitor according to claim 1, wherein the cathode lead-out layer includes a reverse tapered portion having a thickness that increases toward the second end surface.

3. The solid electrolytic capacitor according to claim 2, wherein the exposed portion of the cathode lead-out layer includes a recess internally recessed from the second end surface.

4. The solid electrolytic capacitor according to claim 1, wherein the valve-action metal substrate includes a reverse tapered portion having a thickness that increases toward the first end surface.

5. The solid electrolytic capacitor according to claim 4, wherein the exposed portion of the valve-action metal substrate includes a recess internally recessed from the first end surface.

6. The solid electrolytic capacitor according to claim 1, wherein the exposed portion of the cathode lead-out layer includes a recess internally recessed from the second end surface.

7. The solid electrolytic capacitor according to claim 6, wherein the exposed portion of the valve-action metal substrate includes a recess internally recessed from the first end surface.

8. The solid electrolytic capacitor according to claim 1, wherein the exposed portion of the valve-action metal substrate includes a recess internally recessed from the first end surface.

9. The solid electrolytic capacitor according to claim 1, wherein
the cathode lead-out layer includes a reverse tapered portion having a thickness that increases toward the second end surface, and
the valve-action metal substrate includes a reverse tapered portion having a thickness that increases toward the first end surface.

10. The solid electrolytic capacitor according to claim 9, wherein
the exposed portion of the cathode lead-out layer includes a recess internally recessed from the second end surface, and
the exposed portion of the valve-action metal substrate includes a recess internally recessed from the first end surface.

11. A solid electrolytic capacitor comprising:
a resin molding including:
a laminate of multiple capacitor elements, each capacitor element of the multiple capacitor elements including:
an anode comprising a valve-action metal substrate including a core and a porous portion on a surface of the core;
a dielectric layer on a surface of the anode; and
a cathode opposite to the anode across the dielectric layer and including a cathode lead-out layer; and
a sealing resin sealing the laminate,
wherein the resin molding defines a bottom surface and a top surface opposite to each other in a thickness direction parallel to a lamination direction of the multiple capacitor elements, a first end surface and a second end surface opposite to each other in a length direction perpendicular to the lamination direction, and a first side surface and a second side surface opposite to each other in a width direction perpendicular to the lamination direction and the length direction;
a first external electrode on the first end surface of the resin molding and electrically connected to the valve-action metal substrate exposed at the first end surface; and
a second external electrode on the second end surface of the resin molding and electrically connected to the cathode lead-out layer exposed at the second end surface,
wherein the following are satisfied:
$t_1 < t_2$,
$t_3 < t_4$,
$t_1 > t_3$, and
$t_4/t_3 > t_2/t_1$,
where $t_1$ is a thickness of an inner portion of the cathode lead-out layer, the inner portion not being exposed at the second end surface,
$t_2$ is a thickness of an exposed portion of the cathode lead-out layer, the exposed portion being exposed at the second end surface,
$t_3$ is a thickness of an inner portion of the valve-action metal substrate, the inner portion not being exposed at the first end surface, and
$t_4$ is a thickness of an exposed portion of the valve-action metal substrate, the exposed portion being exposed at the first end surface.

12. The solid electrolytic capacitor according to claim 11, wherein the cathode lead-out layer includes a reverse tapered portion having a thickness that increases toward the second end surface.

13. The solid electrolytic capacitor according to claim 12, wherein the exposed portion of the cathode lead-out layer includes a recess internally recessed from the second end surface.

14. The solid electrolytic capacitor according to claim 11, wherein the valve-action metal substrate includes a reverse tapered portion having a thickness that increases toward the first end surface.

15. The solid electrolytic capacitor according to claim 14, wherein the exposed portion of the valve-action metal substrate includes a recess internally recessed from the first end surface.

16. The solid electrolytic capacitor according to claim 11, wherein the exposed portion of the cathode lead-out layer includes a recess internally recessed from the second end surface.

17. The solid electrolytic capacitor according to claim 16, wherein the exposed portion of the valve-action metal substrate includes a recess internally recessed from the first end surface.

18. The solid electrolytic capacitor according to claim 11, wherein the exposed portion of the valve-action metal substrate includes a recess internally recessed from the first end surface.

19. The solid electrolytic capacitor according to claim 11, wherein
the cathode lead-out layer includes a reverse tapered portion having a thickness that increases toward the second end surface, and
the valve-action metal substrate includes a reverse tapered portion having a thickness that increases toward the first end surface.

20. The solid electrolytic capacitor according to claim 19, wherein
  the exposed portion of the cathode lead-out layer includes a recess internally recessed from the second end surface, and
  the exposed portion of the valve-action metal substrate includes a recess internally recessed from the first end surface.

\* \* \* \* \*